J. D. SULLIVAN AND H. L. FRY.
RESILIENT TIRE.
APPLICATION FILED FEB. 25, 1918.

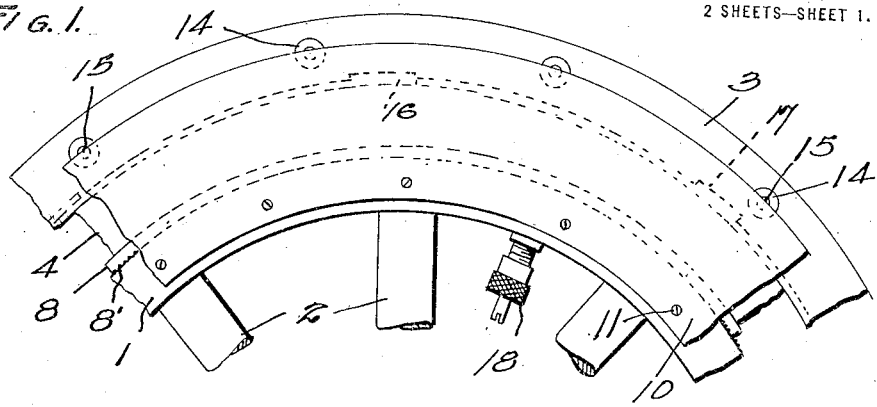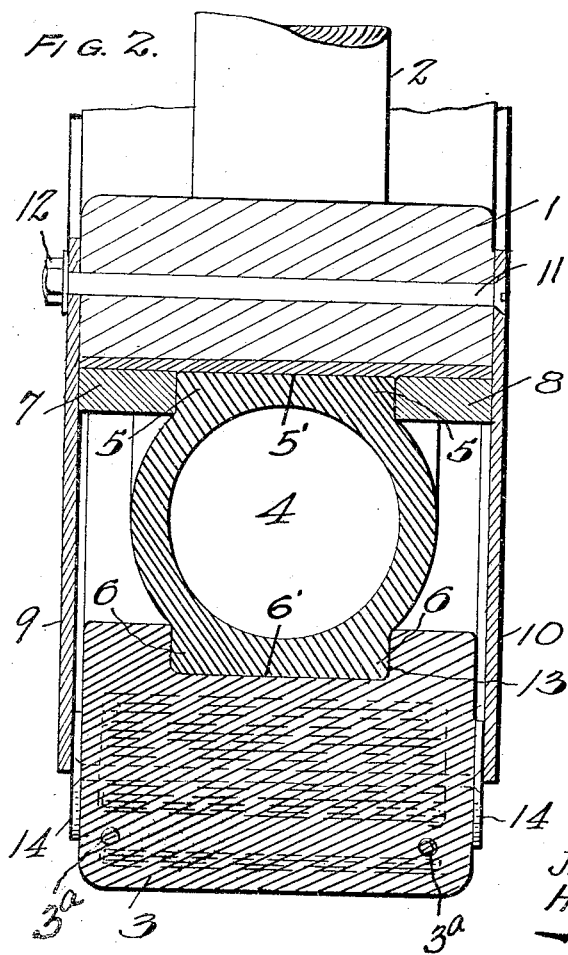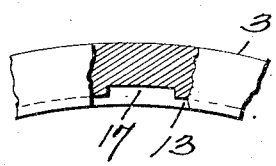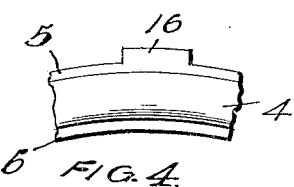

1,355,011.

Patented Oct. 5, 1920.
2 SHEETS—SHEET 2.

INVENTORS
J. D. SULLIVAN
H. L. FRY
BY
Thomas Harris
ATTORNEY

UNITED STATES PATENT OFFICE.

JOHN D. SULLIVAN AND HARRY L. FRY, OF NEW CASTLE, PENNSYLVANIA; SAID FRY ASSIGNOR TO SAID SULLIVAN.

RESILIENT TIRE.

1,355,011.        Specification of Letters Patent.        Patented Oct. 5, 1920.

Application filed February 25, 1918. Serial No. 219,026.

*To all whom it may concern:*

Be it known that we, JOHN D. SULLIVAN and HARRY L. FRY, citizens of the United States of America, residing at New Castle, in the county of Lawrence and State of Pennsylvania, have invented certain new and useful Improvements in Resilient Tires, of which the following is a specification.

Our present invention relates to improvements in resilient tires for automobiles, trucks, and other vehicles, and the tire is of the specific type known as combined pneumatic and cushion tires which contemplates the use of a pneumatic tube or inner casing with a solid, but flexible and resilient shoe of the cushion type.

The primary object is the provision of a tire of this character that is durable, comparatively inexpensive in manufacture, simple in construction, and possessing practically a minimum number of parts, thus rendering the performance of dismounting or attaching the tire to a wheel a simple and facile one.

The invention consists essentially in a peculiarly formed pneumatic tube, that is protected from puncture, and in certain combinations and arrangements of parts including the flexible shoe or solid portion of the tire, as will be hereinafter more specifically pointed out and claimed.

In the accompanying drawings we have illustrated one complete example, and a modified form thereof, of the invention, constructed and arranged according to the best mode we have so far devised for the practical application of the principles of our invention.

Figure 1 is a side elevation of a portion of a wheel tire built according to our invention.

Fig. 2 is an enlarged, transverse sectional view of the tire.

Fig. 3 is a detail view of the shoe showing a channel or groove therein and a locking recess.

Fig. 4 is a fragmentary view of the pneumatic tube illustrating a locking lug complementary to the recess shown in Fig. 3.

Figure 5:
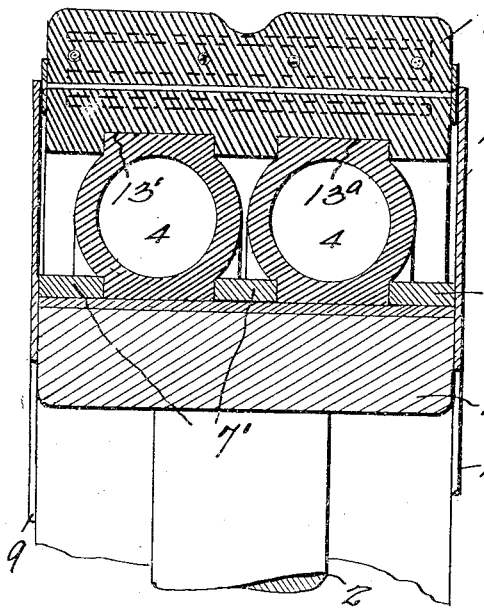
Fig. 5 is a transverse sectional view of a modified form of the tire where a pair of pneumatic tubes are inclosed with the wide shoe.
Figure 7:
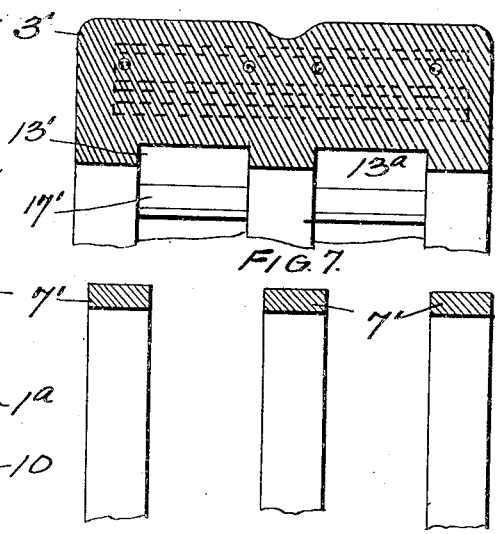
Fig. 7 is a sectional view of the wide shoe, detached.

The tire of the present invention is well adapted to most types of wheels, and the tire may be utilized in connection with newly manufactured wheels, or, as illustrated in the drawings, may be applied to the wheel felly 1 and spokes 2 of well known forms of automobile wheels.

In adapting the invention to the wooden felly 1, a resilient, flexible, cushion or shoe 3 is utilized in conjunction with the pneumatic inner tube 4, and the invention, essentially, resides in the structure or combination of elements produced in attaining the co-action of the solid cushion 3 and the pneumatic tube 4. At its inner and outer periphery, the tube is formed with spaced, parallel beads 5, 5, and 6, 6, which respectively form flat, annular portions or circumferential ribs on the tube indicated at 5' and 6'. Through the medium of the inner flat surface 5' the tube is seated upon the outer periphery of the felly 1, and after the tube is approximately positioned, a pair of metallic retaining or locking rings 7 and 8, one at each side of the tube, are passed over the opposite edges of the felly to hold between them the beaded portions 5, 5, of the tube. The metallic rings 7 and 8 are held in close contact with the ribbed or beaded tube by a pair of side rings 9 and 10 respectively that are attached to the felly by screw bolts 11 passing through the felly and rings, and the locking nut 12. It will be noted that a greater portion of the side rings extends beyond the locking rings, but the effective work of the side rings, in retaining the metal rings 7 and 8 to hold the tube against lateral displacement is enhanced by the close relationship between the side plates, the felly and the rings, and the rings, if desired, may be serrated on their inner peripheries, as at 8' Fig. 1 to prevent circumferential movement or "creeping" of the metal rings. Within the inner periphery of the shoe 3 is formed an annular channel or groove 13 which fits over the beads 6, 6, of the tube, before the latter is inflated, and this co-action of the beads and channeled shoe it will readily be seen prevents lateral movement of the shoe with relation to the tube.

The shoe has spaced at intervals, around its sides, metal bearing, or friction disks 14, 14 and the screws or threaded screw bolts 15 connect and hold the disks to the shoe so that friction, caused by the movement of the resilient tube and shoe, is taken up between these wear plates or disks and the side plates or rings 9 and 10. When the disks wear excessively they can readily be replaced, thus saving the shoe and side plates or rings 9 and 10.

Circumferential movement of the shoe with relation to the tube is prevented by the utilization of spaced peripheral lugs 16 on the tube which fit into complementary spaced notches or recesses 17 formed or countersunk in the channel 13 of the shoe. At 18 Fig. 1 the usual type of valve is illustrated for inflating the tube 4.

The assembling and dismantling of the tire, it will readily be seen is quite simple. To dismantle, the nuts 12 are first removed, then the side plate 9 may be displaced, leaving free access to the metal retaining ring 7. The metal ring 7 may be forced or pried off with a tool, as a screw driver, and then after the tube is deflated the shoe may be displaced, and the tube removed if desired.

The shoe is of special construction and embodies a base of fabric and vulcanized rubber, together with a pair of spaced circumferential cable wires 3$^a$ which act as reinforcements for the shoe, when the tube is inflated, and maintain it in normal outline. Outside of these wires are wrapped additional thicknesses of fabric and then the rubber tread is vulcanized on the shoe, a coating of rubber being provided entirely around the shoe, for the inner fabric formation, and to protect the same from weather.

Figure 8:
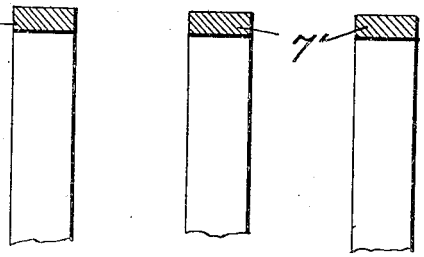
Fig. 8 illustrates the uniform locking rings for the twin tubes of Fig. 5.
Figure 6:
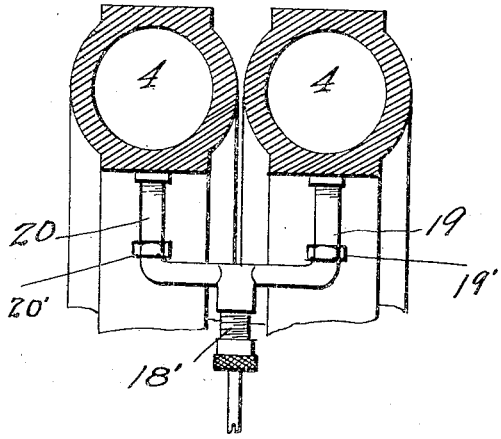
Fig. 6 illustrates the manner of inflating the pair of tubes and equalizing the air pressure therein.
Figure 9:
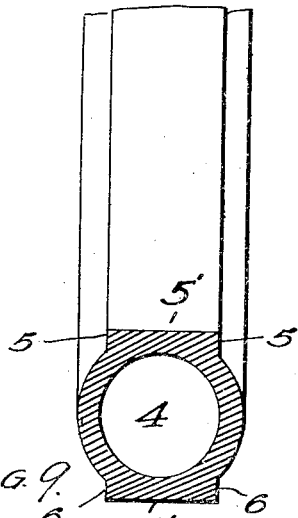
Fig. 9 shows a section of one of the pneumatic tubes, detached.

In Figs. 5 and 8 we have illustrated a pair of the tubes 4, 4, under the wide tread 3′ for use on a truck wheel, or wheel for other heavy vehicle. The wide felly 1$^a$ has the uniform retaining rings 7′ and the wide shoe has a pair of annular channels 13′ and 13$^a$, and the depressions 17′ correspond with the depressions or notches 17 in the shoe 3. The valve device 18′ is connected to the two tubes by branch pipes 19 and 20 and union couplings 19′ and 20′ so that both tubes may be inflated from the one valve, and both tubes may have the same air pressure therein.

What we claim is:—

1. The combination with a wheel felly, of a pneumatic tube therearound, having inner and outer peripheral ribs, retaining rings on the felly at opposite sides of the inner rib, side plates secured to, and extending beyond, the felly in spaced relation to the said tube and engaging the said retaining rings to hold the tube centered on the felly, and a shoe around the tube having tube-centering means to engage the outer rib and in turn slidably interfitting the space between the side plates.

2. The combination with a wheel felly, of a pneumatic tube therearound having inner and outer peripheral ribs, rings around the felly engaging the opposite sides of the inner rib, side plates secured at their inner portions to the felly, said side plates engaging the said rings and extending beyond the felly in spaced relation to the tube, and a shoe slidably interfitting the space between the outer portions of the said side plates, said shoe having a circumferential groove to receive the outer rib of the tube, and coöperating with the said rings to center the tube between the side plates.

3. The combination with a wheel felly, of a shoe around the same and spaced therefrom, a pair of side plates secured to the felly and movably engaging the sides of the shoe, a pneumatic tube between the felly and shoe having inner and outer annular ribs, and means carried by the felly and the shoe to respectively engage the said inner and outer ribs, and coöperating to hold the tube between, and out of contact with, the said side plates.

4. The combination with a wheel felly of a pneumatic tube having an inner and an outer circumferential rib extending each side of its center and formed with abrupt edges, a grooved shoe engaging over the edges of the outer rib, a pair of retaining rings on the felly engaging the edges of the inner rib and means for holding the retaining rings on the felly.

In testimony whereof we affix our signatures.

JOHN D. SULLIVAN.
HARRY L. FRY.